United States Patent [19]

Lymn

[11] Patent Number: 4,913,333

[45] Date of Patent: Apr. 3, 1990

[54] SOLDER LEVELLER

[76] Inventor: Peter P. A. Lymn, Lime Kiln Cottage, Buriton, Petersfield, Hampshire, United Kingdom, GU31 5SJ

[21] Appl. No.: 282,338

[22] PCT Filed: May 27, 1987

[86] PCT No.: PCT/GB87/00366
§ 371 Date: Nov. 25, 1988
§ 102(e) Date: Nov. 25, 1988

[87] PCT Pub. No.: WO87/07195
PCT Pub. Date: Dec. 3, 1987

[30] Foreign Application Priority Data

May 29, 1986 [GB] United Kingdom ............... 8613104

[51] Int. Cl.[4] ............................................. B05C 3/04
[52] U.S. Cl. ...................................... 228/20; 228/37; 228/180.1; 118/63; 118/57
[58] Field of Search ............... 228/20, 180.1, 37, 223; 118/63, 425, 56, 57

[56] References Cited

U.S. PATENT DOCUMENTS

| 2,875,717 | 8/1955 | McWilliams . | |
| 3,795,358 | 3/1974 | Sarnacki et al. | 228/20 |
| 4,083,323 | 4/1978 | Rote | 228/20 |
| 4,315,042 | 2/1982 | Spigarelli | 228/20 |
| 4,635,584 | 1/1987 | Obermann | 228/20 |
| 4,708,281 | 11/1987 | Nelson et al. | 228/180.1 |

FOREIGN PATENT DOCUMENTS 957094 1/1957 Fed. Rep. of Germany .

Primary Examiner—Nicholas P. Godici
Assistant Examiner—Mike Starkweather
Attorney, Agent, or Firm—Lee A. Strimbeck

[57] ABSTRACT

A solder leveller comprises a solder bath into which a printed circuit board can be dipped to be preliminarily tinned. A pair of upright laterally acting jaws are adapted along an extended part of their length to hold the board at its opposite side edges and operate to insert in and withdraw the board from the bath. An air knife removes excess solder. The jaws are guided centrally of the bath by engagement of the side faces with the air knife nozzles which act as fixed guides.

17 Claims, 3 Drawing Sheets

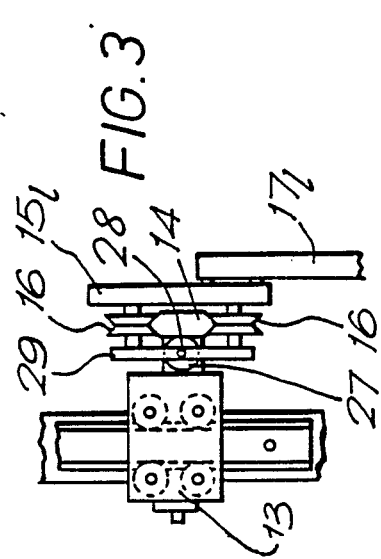
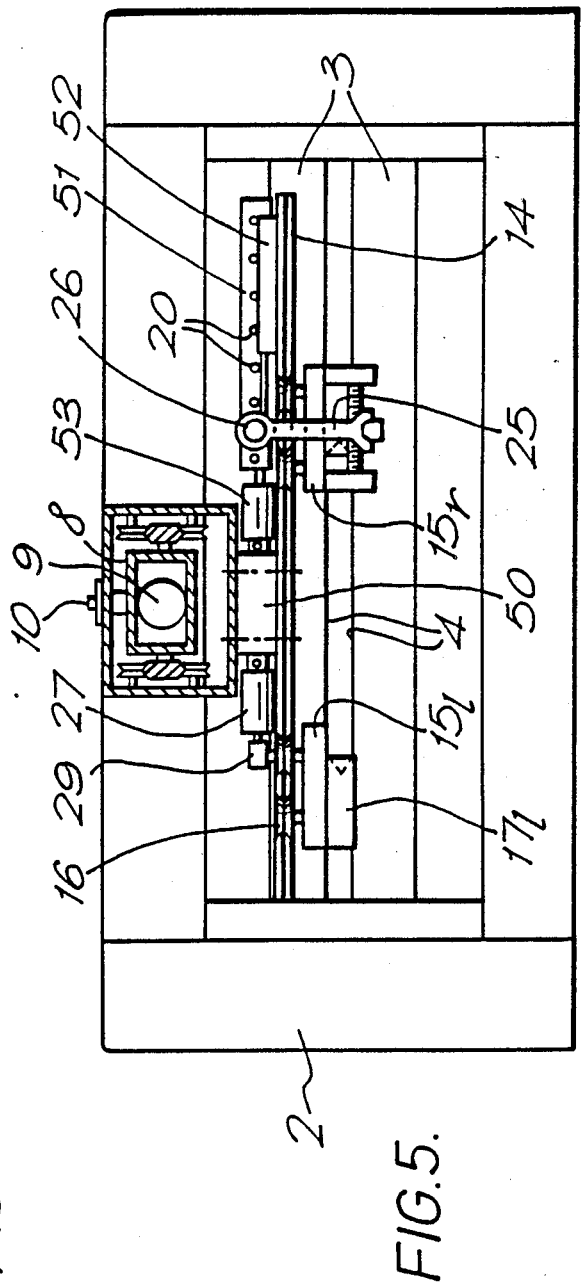

SOLDER LEVELLER

THE FIELD OF THE INVENTION

A solder leveller is apparatus for coating exposed metal—normally copper—on printed circuit boards, and similar elements—particularly for supporting electronic components—hereinafter referred to as "boards", with solder preparatory to connection of components thereto. A solder leveller normally comprises a solder bath, into which a board to be soldered is lowered, and means for levelling solder deposited on the board as it is withdrawn from the bath.

A solder leveller of the type with which the present invention is concerned includes means for gripping the board, inserting it into the solder bath and withdrawing it therefrom.

THE BACKGROUND OF THE INVENTION

The solder levelling means is intended to provide a substantially uniform thickness of solder on the exposed copper and to unblock any holes through the board which might otherwise be blocked by solder. The levelling means may be arranged to direct hot liquid at the board as it is withdrawn from the solder. However, it is presently preferred to direct hot air at the board by means of so called "air knives" for levelling the solder as the board is withdrawn from the solder bath.

Such a solder leveller is described in UK Patent Specification No. 1,457,325 and equivalent U.S. Patent Specification No. 3,865,298 (U.S. Atomic Energy Commission). This prior leveller includes means for deflecting hot air from the air knives away from the surface of the molten solder in the solder bath. These deflection means can in practice be dispensed with, particularly where the molten solder in the bath is continuously recirculated whereby any flux and/or dross (oxidized solder) is carried by the flow of the molten solder away from the area of the surface of the molten solder through which the board is to be inserted.

When a board is being treated in such a recirculating solder leveller, it may be displaced from its preferably central position in the solder bath to the extent that it is scratched on withdrawal from the bath. Scratching is likely to result in the board being reject. Such scratching is believed to result from contact with the walls of the solder bath.

The usual manner of supporting a board for insertion in the bath is from above. This can lead to the possibility of the board being deflected by the flow of solder to one side of the bath and contacting the corresponding side wall whereby on withdrawal of the board it scrapes along the side wall and becomes scratched.

Accordingly, in my UK Patent No. 2,151,528 (which has an equivalent U.S. Pat. No. 4,599,966) I describe and claim a solder leveller including means for recirculating molten solder to and from the solder bath which comprises parallel spaced apart side walls, end walls and a bottom wall, the recirculating means comprising a plurality of side wall ducts having side wall ports therein one above another to direct a flow of solder against opposite sides of a board inserted in the bath, an elongate bottom wall duct extending along the bottom wall of the bath, the bottom wall duct having ports communicating with the lower ends of the side wall ducts, and means for pumping solder through the elongate bottom wall duct, the side wall ducts and the bath, in such manner that the flow of solder in the solder bath biasses a board inserted therein away from side walls of the solder bath.

However, although this leveller has proved successful, in practice, it is normally necessary to augment the effect of the side wall ducts on the centring of the board in the solder bath with guides for guiding the edges of the board, if only to ensure that as the board is initially lowered into the solder bath it is centred. These guides can cause problems. In particular, they interfere with the deposit of solder onto the edge regions of circuit boards.

Irregularly shaped boards are awkward to process because part of their edge portions are located by the guides whilst other parts do not extend as far as the guides and are not located. These problems are aggravated with smaller boards.

Small boards provide an additional problem in that they may have no spare surface area at which a clamp or other holding means active at the top edge of the board can hold them.

THE INVENTION

Accordingly, I have perceived the need for an improved solder leveller in which these problems of guiding and gripping of the board are alleviated and it is the object of the present invention to provide such a leveller.

In the solder leveller of the invention the gripping, insertion and withdrawal means comprises a pair of upright, laterally acting jaws adapted along an extended part of their length for holding a board at its opposite side edges; means for closing the jaws to grip the board; and means for supporting the jaws above the solder bath.

Advantageously, the jaws have concave board holding faces, the preferred concave face shape being a V-groove shape extending along the jaws.

The lower, free ends of the jaws may extend unguided into the solder bath; but fixed guides extending transversely of the jaws' travel are preferably provided. Since the jaws are relatively inflexible, the guides can be restricted to act at one height only and are conveniently in the form of the opposite edges of air knife nozzles, when the latter are provided in the solder levelling means.

Conveniently the jaws are mounted on a laterally extending cross member, each jaw being movable along the cross member. This arrangement enables one jaw to be moved through a predetermined stroke for on the one hand opening the jaws to release a board and on the other hand closing the jaws to grip a board; whilst the other jaw can be moved for overall adjustment of the bight of the jaws. In an alternative one jaw could be fixed whilst the other is both movable for opening and closing and for adjustment.

The molten solder in the solder bath must be hotter than the eutectic temperature of tin-lead, i.e. 183° C. This results in a considerable bowing of wide printed circuit boards contained widthwise by the jaws, when heated from ambient temperature on insertion into the molten solder. Such bowing can result in the board fouling the air knives on withdrawal from the solder. Accordingly the actuator arranged to close the jaws to the board may be arranged to relax them to a small extent prior to withdrawal of the board. Alternatively a separate actuator for the adjustable jaw may be provided to relax it.

To help understanding of the invention, a specific embodiment thereof will now be described with reference to the accompanying drawings.

THE DRAWINGS

FIG. 3 is a scrap side view similar to FIG. 2 in the direction of the arrow III in FIG. 1;

FIG. 4 is a scrap cross-sectional view on the line IV—IV in FIG. 2; of the jaws and board alone; and FIG. 5 is a plan view of a solder leveller showing a variant.

THE PREFERRED EMBODIMENT

Figure 1:
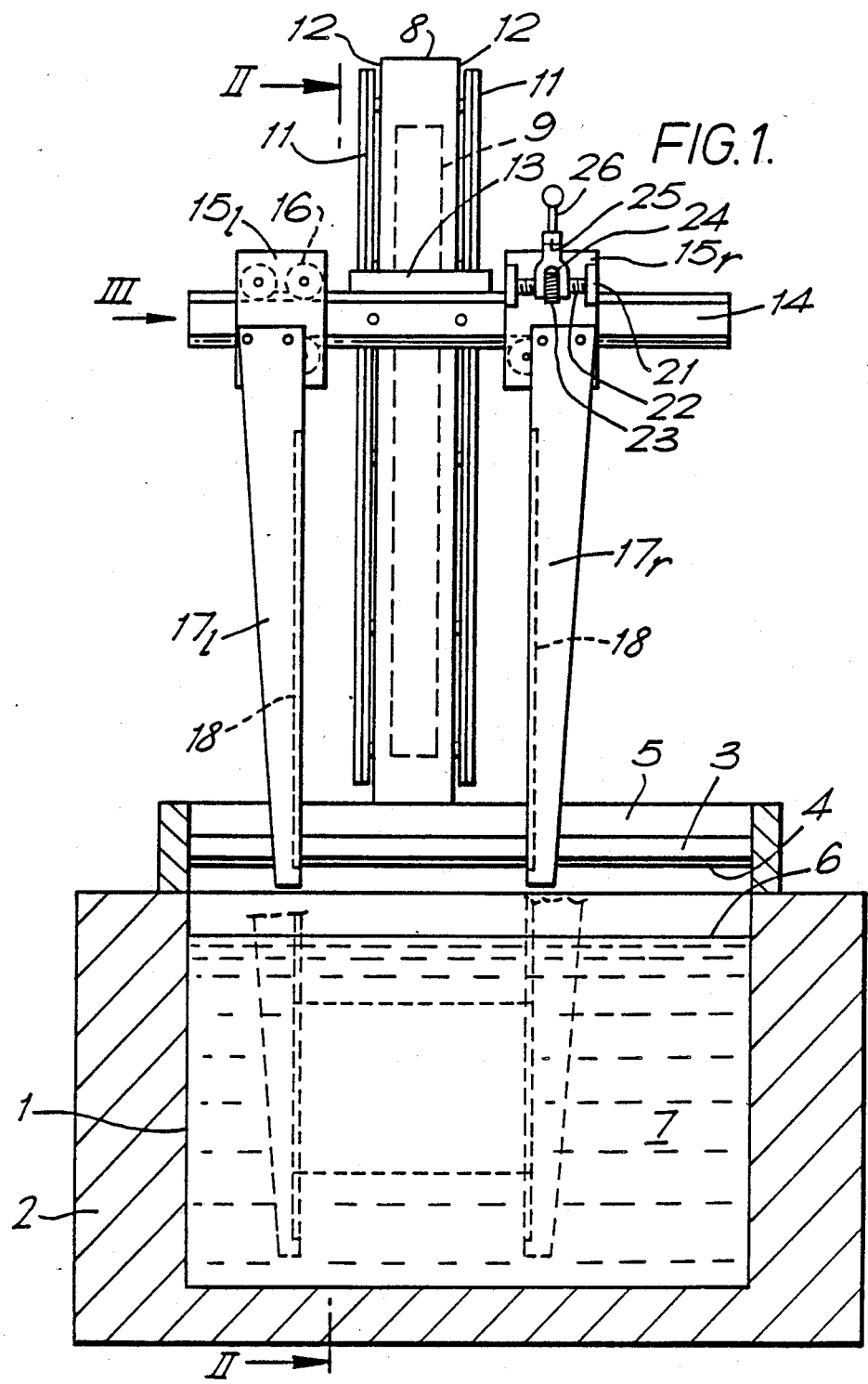
FIG. 1 is a cross-sectional front view of a solder leveller of the invention, the cross-section being taken on the line I—I in FIG. 2.
Figure 2:
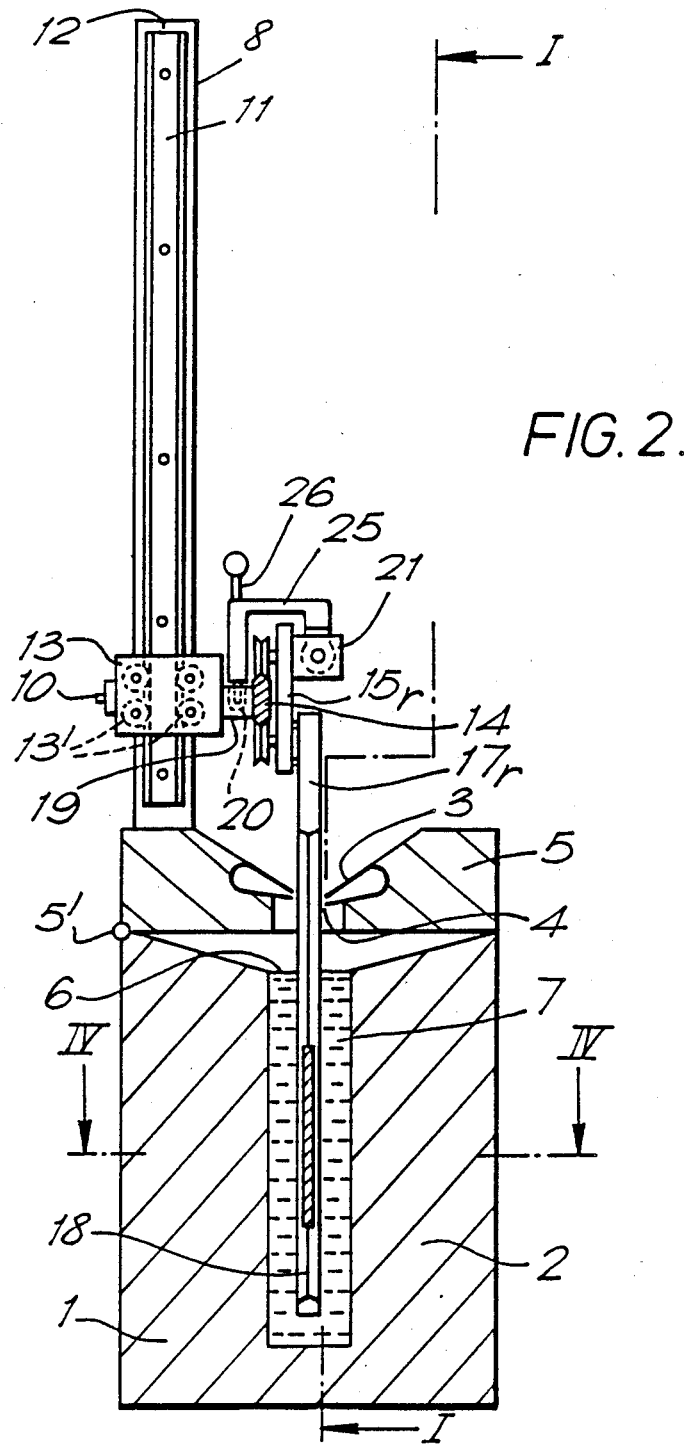
FIG. 2 is a cross-sectional side view of the solder leveller of FIG. 1, the cross-section being taken on the line II—II in FIG. 1.

The solder leveller has a solder bath 1, including insulation, means for heating of solder in the bath and for circulating solder to and from the bath together shown in outline at 2 since these features are conventional. So called "air knives" 3 are provided with nozzles 4 oppositely arranged the one slightly above the other. The air knives are provided in an upper housing 5 which can be lifted about a pivot point 5' for access to the free surface 6 of the molten solder 7. Again these features are conventional.

A rectangular, steel column 8 extends up from the housing 5 and accommodates a rodless cylinder 9. The cylinder's drive member 10 extends rearwardly out of a slot (not shown) in the column. A pair of knife-edge rails 11 are fixed along the opposite sides 12 of the column 8. A yoke 13 surrounds the column and carries rollers 13' inside the side parts of the yoke, the rollers 13' engaging and being guided by the rails 11. The rodless cylinder's drive member 10 is connected to the yoke, whereby the yoke 13 can be moved up or down the column.

Attached to the front of the yoke 13 is a transverse, knife-edge guide rail 14. Two jaw carriers $15_r$, $15_1$ are mounted for lateral movement along the guide rail 14, via two upper and two lower Vee rollers 16 each. Elongate, downwardly tapering jaws $17_r$, $17_1$ are bolted one to each carrier. The jaws have Vee grooves 18 in opposed edges. The bottom end of each of these grooves is closed to prevent a board only loosely held from dropping from the grooves.

To the right of the yoke 13, a rib 19 extends behind the guide rail 14, the rib 19 having a series of apertures 20 in its upper surface and spaced along its length. The right hand carrier $15_r$ has a pair of flanges 21 extending forwardly with a horizontal screwed shaft 22 fixed between them. The shaft carries a thumb nut 23 and a clevis 24 embracing the nut. An upper extension 25 of the clevis passes over the guide rail 14 and supports a plunger 26 which is spring biassed into a selected one of the apertures 20. Movement of the plunger from one aperture to the next provides coarse adjustment of the position of the carrier 15, whilst screwing of the nut 23 along the shaft 22 provides fine adjustment of the carrier and of the lateral position of the right hand jaw $17_r$.

To the left of the yoke 13 a pneumatic actuator 27 is secured behind the guide rail 14. The rod 28 of the actuator is secured to a finger 29 crossing behind the rail 14 and fixed to the left hand carrier $15_1$. The actuator has a short stroke for moving the left hand jaw $17_1$ between an open position moved away from the other jaw and a closed position moved towards the other jaw for gripping a board 30.

FIG. 1 shows the transverse guide rail 14 raised and raising with it the jaws $17_r$, $17_1$. In this position, the right hand jaw $17_r$ is adjusted until the bight of the jaws is such that on operation of the actuator to open the jaws, the circuit board 30 can be introduced at its edges into the Vee grooves 18 and that on subsequent closing of the jaws the board is tightly gripped at its side edges. The printed circuit faces of the board are not mechanically obscured by the jaws which abut the board's edges, at the right angle corners between the faces and the side edges, via the angled faces 31 of the jaws—see FIG. 4. For insertion of the board into the jaws' grooves, one side edge can be inserted into one jaw groove and the other guided in between the operator's grooved thumb and fore finger gripping the board and jaw on opposite sides. In an alternative a rearwardly withdrawable stop 32, shown dashed in FIG. 4, may be provided adjacent the jaw $17_1$ for the board to be abutted against after insertion into the groove of the jaw $17_r$. The stop guides the board into alignment with the groove of the jaw $17_1$. The stop may be withdrawable by an actuator ganged to the actuator 27 so that it is in position only when the jaws are open and is withdrawn at all other times There is no requirement for the board to be of regular rectangular shape for it to be gripped in the jaws' V-grooves. Thus irregularly shaped boards can be processed. This is a significant advantage of the invention.

Once the board is gripped, the rodless cylinder is actuated to insert the board into the solder bath. The bottom ends 33 of the jaws remain between the air knives' nozzles even when the jaws are fully withdrawn upwardly, whereby the jaws are permanently guided to remain in the centre of the solder bath. After the conventional dwell time, the jaws are withdrawn upwards with the exposed copper on the board now tinned with solder The actuator 27 is operated and the board removed. If provided, the optional stop 32 can be programmed not to be brought forward on opening of the jaws after insertion so as not to mark the tinned board.

To avoid deposit of solder on the jaws, they are conveniently of titanium. Although the solder does not "wet" the jaws, it flows to the very edges of the board supported by the jaws' grooves so that the copper of the board is wetted and tinned right up to the very edges.

VARIANT

In FIG. 5, the rib 19 is replaced by a central portion 50 connecting the guide rail 14 to the yoke 13 and a movable portion 51 behind the right hand limb of the guide rail 14. The portion 15 is slidably secured to the guide rail by means of a slide 52 and is arranged to be movable axially of the guide rail under control of a further pneumatic actuator 53 to enable the jaws to be incrementally opened whilst the board is immersed in the solder. This accommodates expansion the board due to heating on immersion so that consequent bowing of large boards does not cause them to foul the air knives nozzles It is envisaged that a single incremental movement for any size of board over 300 mm wide will suffice. Nevertheless, the incremental movement may be arranged to be proportional to the bight of the jaws.

An advantage of the solder leveller is that it can be used for tinning copper contact pads of boards in the form of ceramic substrates, which have been virtually impossible to process with conventional solder levellers.

I claim:

1. In a solder leveller having a solder bath, into which a board to be coated with solder is lowered in a substantially vertical disposition, means for gripping the board, inserting it into said solder bath and withdrawing it therefrom, means for levelling solder deposited on the board as it is withdrawn from said bath, and means for driving said board gripping means downwardly for insertion of a gripped board into said solder bath and upwardly for withdrawal of the board, the improvement wherein said gripping, insertion and withdrawal means comprises a pair of upright, laterally acting jaws adapted along an extended part of their length for holding a board at its opposite side edges; means for closing said jaws to grip the board; and means for supporting said jaws above said solder bath.

2. A solder leveller according to claim 1, wherein said jaws have concave board holding faces.

3. A solder leveller according to claim 1, wherein said concave faces comprise V-grooves.

4. A solder leveller according to claim 2, wherein said V-grooves have closed bottom ends to prevent dropping of a board whose side edges are held in said grooves.

5. A solder leveller according to claim 1 wherein said means for levelling solder deposited on the board are a pair of opposed air knifes transverse to the path of travel of said board and impinging on either side of said board.

6. A solder leveller according to claim 5 wherein each said air knife has a nozzle which nozzle serves as a fixed guide for said jaws.

7. A solder leveller as claimed in claim 4, wherein bottom ends of said jaws remain between said fixed guides in a fully withdrawn position of said jaws above said solder bath.

8. A solder leveller according to claim 1, wherein said jaw supporting means comprises a laterally extending cross member on which said jaws are mounted for relative movement therealong; one said jaw is mounted on said cross member for adjustment therealong to a position determined by the width of the board; and said other jaw is mounted for movement along said cross member through a short predetermined stroke towards and away from said one jaw to grip and release a board therebetween.

9. A solder leveller according to claim 7, including an actuator mounted on said jaw supporting means for moving said other jaw through its predetermined stroke.

10. A solder leveller according to claim 7, including means on said jaw supporting means for moving said one jaw incrementally along said cross member to allow for expansion of the board.

11. A solder leveller according to claim 7, wherein said jaw supporting means includes a jaw carrier mounted on said cross member and on which said one jaw is mounted, a member extending parallel to said cross member and having a series of apertures and a plunger carried on said jaw carrier, said plunger being selectively engageable in said apertures.

12. A solder leveller according to claim 10, wherein said one jaw is movably mounted on said jaw carrier for fine adjustment towards or away from said other jaw and said jaw carrier including means for effecting said fine adjustment.

13. A solder leveller as claimed in claim 10, wherein said fine adjustment means includes a threaded shaft fixed on said jaw carrier parallel to said cross member, a nut rotatably engaged upon said shaft, and a clevis embracing said nut and supporting said plunger.

14. A solder leveller according to claim 10, including an actuator and a slide connecting said member having said apertures to said cross member by means of which it is incrementally movable therealong to enable said jaws to be incrementally opened to allow for expansion of the board.

15. A solder leveller according to claim 1, including a withdrawable stop adjacent one of said jaws for the board to be abutted against after engagement with the other of said jaws.

16. A solder leveller according to claim 8, including a withdrawable stop adjacent one of said jaws for the board to be abutted against after engagement with the other of said jaws, said stop being arranged to be withdrawn when said jaws are closed by said actuator.

17. A solder leveller comprising:
a bath into which a board to be coated with solder is lowered;
air knives having nozzles for levelling solder coated onto the board as the board is withdrawn from molten solder in said bath;
an upper housing pivotally connected to said bath and carrying said air knives;
a column mounted on said upper housing;
a yoke mounted on said column for movement therealong;
an actuator mounted on said column for movement of said yoke;
a guide rail extending transversely of said column above said air kives and carried by said yoke;
two jaw carriers mounted on said guide rail for movement therealong;
respective jaws depending from said jaw carriers and guided by said air knife nozzles between which they extend, said jaws having grooves in opposed faces for gripping a board;
a fine adjustment mechanism for adjusting the position of one of said jaws along said guide rail; and
a jaw opening mechanism including an actuator for moving the other of said jaws between an open position displaced away from said one jaw in which a board is positioned between said two jaws and a closed position displaced towards said one jaw in which a board is gripped between said two jaws for insertion in and withdrawal from said solder bath.

* * * * *